United States Patent [19]
Jackson et al.

[11] Patent Number: 5,355,058
[45] Date of Patent: Oct. 11, 1994

[54] HORIZONTAL DEFLECTION WAVEFORM CORRECTION CIRCUIT

[75] Inventors: David R. Jackson, Indianapolis; Joseph C. Stephens, Fishers, both of Ind.

[73] Assignee: Thomson Consumer Electronics, Inc., Indianapolis, Ind.

[21] Appl. No.: 99,376

[22] Filed: Jul. 29, 1993

[51] Int. Cl.⁵ .......................... G09G 1/04; H01J 29/70
[52] U.S. Cl. .................................. 315/371; 315/367; 315/389
[58] Field of Search .................. 315/371, 367, 389

[56] References Cited

U.S. PATENT DOCUMENTS

| | | | |
|---|---|---|---|
| 2,758,248 | 8/1956 | Garrett et al. | 315/371 |
| 3,944,879 | 3/1976 | Suzuki | 315/370 |
| 4,687,972 | 8/1987 | Haferl | 315/371 |
| 4,965,495 | 10/1990 | Wilber et al. | 315/371 |

OTHER PUBLICATIONS

Sony Training Manual for ANU-2 Chassis, Cover, frontis piece and pp. 26, 27, 30 and 31.
Sony Service Manual for ANU-2 Chassis Model KV-27EXR95, pp. 1, 49 & 68, Dated 1992.
Sony Service Manual for ANU-1 Chassis, Model KV-32HSR10, pp. 1, 35, 36 & 68 Dated 1989.
Thorn 9500 Series Colour Television Service Manual, published by Thorn Consumer Electronics Service Division, dated Dec. 1977, p. 28.
Thorn 9000 Series Colour Television Service Manual, published by Thorn Consumer Electronics Service Division, dated Nov. 1975, p. 19.
Schematic of the Deflection and Power Supply Circuit in the Metz Color 7400 Series Television Receivers, Chassis 684 G-1.
U.S. application Ser. No. 099,301.
U.S. application Ser. No. 099,377.

*Primary Examiner*—Gregory C. Issing
*Attorney, Agent, or Firm*—Joseph S. Tripoli; Joseph J. Laks; Francis A. Davenport

[57] ABSTRACT

A deflection apparatus comprises a deflection amplifier coupled to a deflection waveform modulation circuit such as a diode modulator. An East-West modulation signal is generated by a digital to analog convertor in accordance with a reference potential coupled thereto. The modulation signal has a DC component for width control, and is coupled to an input of a comparator. The reference potential is also coupled to an input of the comparator to establish a reference bias therefor. The comparator has an output coupled to the deflection waveform modulation circuit to provide the East-West modulation.

20 Claims, 2 Drawing Sheets

HORIZONTAL DEFLECTION WAVEFORM CORRECTION CIRCUIT

BACKGROUND OF THE INVENTION

This invention relates to the field of cathode ray tube deflection amplitude control, such as East-West waveform correction of horizontal deflection signals generated by a bus controlled integrated circuit.

The development of single integrated circuits containing both analog and digital television signal processing has greatly reduced receiver parts count, improved reliability and reduced manufacturing cost. Such integrated circuits frequently employ sync separation circuitry to lock a reference oscillator from which horizontal and vertical rate deflection signals are developed. To facilitate control of the IC functions with a minimum of circuit board potentiometers and to minimize the IC pin count, the integrated circuit may be controlled via a data bus. An example of a data bus system is the Thomson logic protocol which comprises three control lines, data, clock and enable respectively. The IC usually contains memory registers which store digital values that correspond to setup, alignment or user determined values for specific parameters. The stored digital data is converted to an analog value by a digital to analog converter. This analog value is coupled out of the IC to control the specific parameter in external circuitry.

To reduce the IC pin count, certain waveforms and control signals may output on common IC pins. For example, a horizontal pincushion correction waveform, namely a vertical rate parabola, may be output together with a horizontal width determining DC voltage. Thus a single IC pin is used for two circuit control functions. The selection of horizontal pincushion, and horizontal width control parameters is advantageous since both parameters may be controlled by a common deflection circuit configuration, for example a pulse width modulator coupled to a pincushion diode modulator. Thus the vertical rate parabola may be superimposed on a horizontal width determining DC voltage. However, this composite control signal requires DC coupling to the point of circuit control. Furthermore, control requirements may exist for certain deflection yoke/tube combinations which require control signal amplitudes which tend to exceed the output voltage swing capability of the multifunction IC. Hence constraints exist within the IC which limit the maximum amplitude ratio of the two control signals. Additional constraints exist within the IC in terms of the range of digital control, i.e. number of control data bits, and the consequential size requirements for control value memory.

SUMMARY OF THE INVENTION

A deflection apparatus comprising a deflection amplifier and a deflection waveform modulation circuit coupled thereto. A digital to analog converter for generating a modulation signal coupled to a means for generating a reference signal thereby subjecting said modulation signal to signal variations in accordance with variations of said reference signal. A comparator having two inputs, said digital to analog converter being coupled to one of the inputs, and said reference signal being coupled to one of the inputs, such that signals developed at said comparator inputs track one another in accordance with said variation of said reference signal. The comparator having an output coupled to said deflection waveform modulation circuit for waveform modulation.

DETAILED DESCRIPTION

Figure 1:
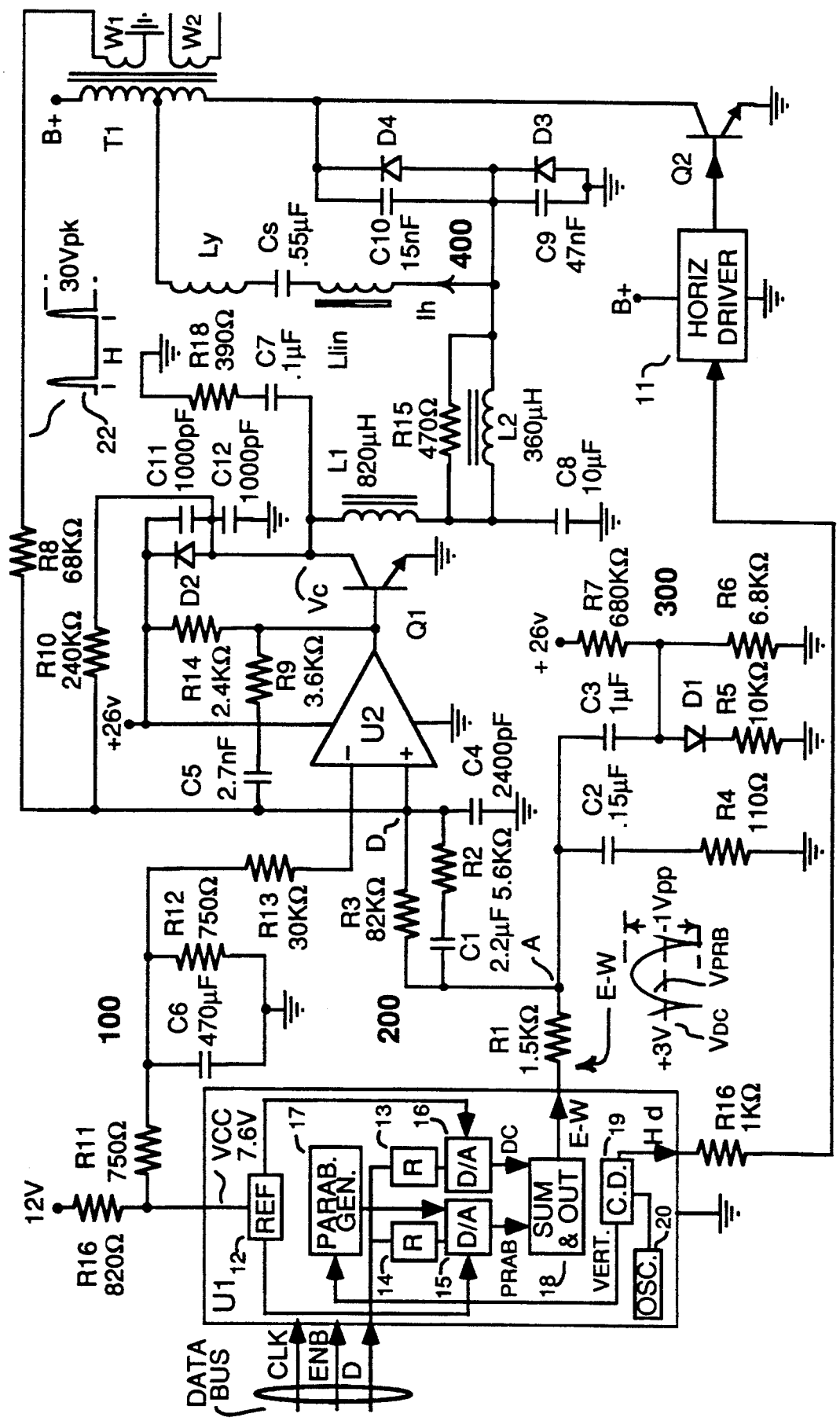
FIG. 1 is a circuit diagram of a horizontal deflection circuit with waveform correction according to various inventive arrangements described herein.

FIG. 1 shows a horizontal deflection circuit based on the use of an integrated circuit U1, which contains a multiplicity of analog and digital television circuit functions. Integrated circuit U1 generates a horizontal rate signal Hd, which is coupled via a driver stage to a horizontal output transistor Q2. Transistor Q2 is coupled to output transformer T1 which has a primary winding tapped to drive a deflection winding Ly. Output transformer T1 has secondary windings W1 and W2. Winding W1 generates a retrace pulse of about 30 volts peak. Winding W2 is coupled to a high voltage ultor power supply generator (not shown). East-West, or pincushion deflection waveform correction is provided by a diode modulator 400. The diode modulator is coupled to the deflection winding Ly and effectively varies the current through the winding in a parabolic manner at vertical rate. Transistor Q1 functions as a saturated switch coupled to the diode modulator and responsive to a horizontal rate, variable width pulse, generated by voltage comparator U2. An input of comparator U2 sums a vertical rate parabola with a DC component from integrated circuit U1, together with an integrated horizontal retrace pulse from transformer T1 winding W1. This composite waveform is compared against a reference potential applied to a second comparator input and results in a comparator output signal having a horizontal rate pulse with a width that varies responsive to the vertical rate parabola.

Integrated circuit U1 is controlled by a microcomputer system (not shown) via three input lines, namely serial data, clock pulse and an enable signal. The serial data employs a Thomson logic protocol. Integrated circuit U1, contains an oscillator OSC 20, operating at 32 times horizontal frequency. This oscillator is phase locked (not shown in FIG. 1), to a horizontal sync signal from a selected video source, ie either base band video input or a sync signal demodulated from an RF modulated source. A count down circuit CD 19, produces both horizontal and vertical rate waveforms. A horizontal rate signal Hd, is coupled from IC U1 via a resistor R16, to a horizontal driver stage 11. The horizontal driver is coupled the base of a horizontal output transistor Q2. The emitter of transistor Q2 is grounded and the collector is coupled to a B+ power supply via output transformer T1. Transformer T1 has a primary winding with a tap for driving a horizontal deflection coil Ly. Transformer T1 has a secondary winding W1 which generates a retrace pulse 22 of approximately 30 volts. Retrace pulse 22 is integrated by a resistor R8 and a capacitor C4 to generate a horizontal rate sawtooth voltage which is coupled to a summing network at the positive input of comparator U2. Transformer winding W2 is coupled to an ultor power supply which is not shown. The horizontal deflection coil Ly, is coupled in series with an "S" correction capacitor Cs and a linearity correction inductor Llin.

Pin cushion or East-West deflection correction is produced by diode modulator 400. The diode modulator is formed by diodes D3 and D4 coupled in series with each other and in parallel with series combination of capacitors C9 and C10 respectively. Diode D4 cathode is coupled to the collector of transistor Q2. Diode D4 anode is joined to the cathode of diode D3 and the junction point is coupled to linearity inductor Llin. The junction of diode D3 cathode, and capacitors C9, C10 is coupled via an inductor L2 to the junction of an inductor L1 and capacitor C8. Inductor L2 is bridged by a damping resistor R15. Capacitor C8 decouples the horizontal rate pulse current to ground and develops a vertical rate parabolic waveform voltage responsive to the parabolic width modulation of the horizontal pulse.

The collector of transistor Q1 is coupled to a resistor R18 and a capacitor C7 coupled in series to ground. This network, also known as a "snubber", dissipates inductive switching transients produced by inductor L1 at the cessation of current flow in transistor Q1. The time constant of resistor R15 and capacitor C7 is selected to slow the rise of transistor Q1 collector voltage at transistor switch off. Diode D2 anode is connected to the collector of transistor Q1, the cathode being connected to the voltage supply. Thus diode D2 is normally reverse biased by the 26 volt supply. However, when transistor Q1 switches off, the positive voltage transient produced by inductor L1 turns on diode D2, clamping the transient and conducting the inductive current into the 26 volt supply. Thus diode D2 and the "snubber" network formed by capacitor C7, and resistor R15 prevent over dissipation and failure of transistor Q1. Capacitors C11 and C12 bypass high frequencies to prevent the generation of radio frequency harmonics resulting from transistor Q1 switching. Transistor Q1 collector is also coupled via resistor R10 to provide negative feedback to the summing point at the non-inverting input of voltage comparator U2.

The positive input of comparator U2 is connected to network 200 which, in conjunction with negative feedback via resistor R10 sums a vertical rate parabolic waveform and DC component, coupled via resistors R2, R3 and capacitor C1, with the horizontal rate ramp formed across capacitor C4 by integration of the retrace pulse. The result of the summation is a horizontal ramp superimposed on the field rate parabola. When the waveform sum applied to the non-inverting input is less than the reference potential applied to the inverting input of comparator U2, the comparator output remains at close to ground potential. Thus the comparator output circuitry sinks current from the 26 volt supply via resistor R14, holding transistor Q1 non-conductive. When the waveform sum exceeds the reference voltage set at the negative input of comparator U2, the output switches from ground, allowing current via resistor R14, to supply the base of transistor Q1 causing it to turn on.

Figure 2A:
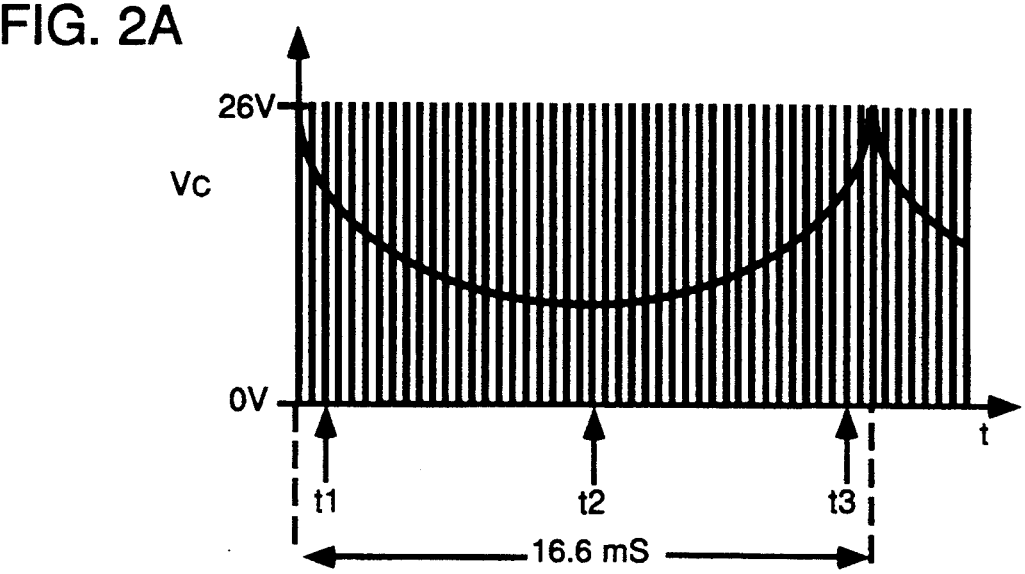
FIG. 2A depicts width modulated pulses at the collector of transistor Q1 viewed over a time interval of one TV field.
Figure 2B:
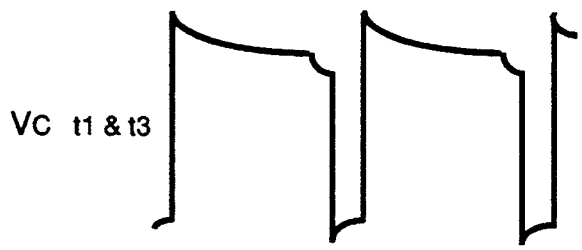
FIG. 2B depicts width modulated pulses at the collector of transistor Q1 at time interval t1 and t3.
Figure 2C:
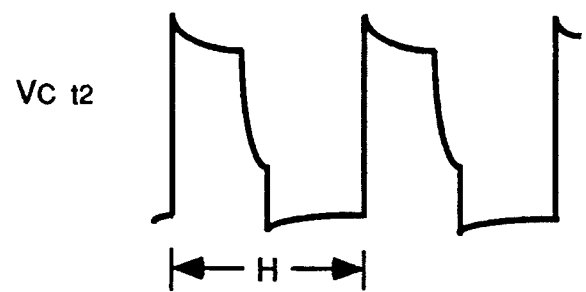
FIG. 2C depicts width modulated pulses at the collector of transistor Q1 viewed at time interval t2.

The DC component of the vertical parabola establishes an average value for the parabola and hence sets the average horizontal deflection amplitude or width. The parabola component causes the integrated horizontal flyback pulse to move across the comparator switching threshold following the parabolic wave shape. Hence the comparator output comprises a horizontal rate pulses having widths which vary responsive to the vertical parabola. FIG. 2A depicts the collector voltage of transistor Q2 over the period of one TV field or 16.6 mS. Although this waveform is composed of horizontal rate pulses, the parabolic width modulation may be observed. Near the cusps of the parabola, as depicted by time intervals t1 and t3, corresponding to top and bottom of the TV field respectively, only the tip of the integrated retrace pulse exceeds the comparator switching threshold. This results in the generation of a narrow negative going output pulse as shown in FIG. 2B. At the peak of the input parabola, corresponding to time interval t2, a greater portion of the integrated pulse exceeds the reference input, resulting in a negative going output pulse of greater width, as depicted by FIG. 2C. Thus, the collector of transistor Q1 has a horizontal rate pulse waveform, width modulated by the vertical parabola, and switched between the nominal supply voltage and ground. The parabolic waveform component at transistor Q1 collector is integrated and low pass filtered by inductor L1 and capacitor C8 which provide pincushion correction current to diode modulator 400 via inductor L2. Comparator U2 is a switching amplifier operating in the class D mode. At low frequencies, for example, at the parabolic signal frequency, a negative feedback loop is provided by resistor R10 to the non-inverting input of the comparator U2. Comparator U2 may be alternatively configured as a linear class A amplifier to drive a linear diode modulator. Resistor R9 and capacitor C5 couple comparator U2 output to the non-inverting input and result in positive feedback which improves comparator switching speed.

Integrated circuit U1 is controlled via a data bus as shown in FIG. 1. The data bus comprises three signals, data D, clock CLK and enable ENB. During receiver setup, adjustments are made to various parameters using a microprocessor controller not shown, and the adjustment value is sent to IC U1 via the data bus as digital data. The digital data is received and stored in a memory register R. For example, the amplitude value of the East-West parabolic signal is determined by 3 data bits which are stored in memory register 14. The DC width signal is determined by 4 data bits, which for example, are stored in register 13. A vertical rate parabolic signal is generated by a PARAB GEN. 17 using a vertical pulse signal, VERT., produced by a count down circuit 19. The parabola signal is controlled in level responsive to the value of the control data word stored in memory register 14. The data word from register 14 is applied to a digital to analog converter 15, configured as an R-2R ladder, where it controls the parabola amplitude. The parabolic signal is coupled to a summing amplifier 18. Horizontal deflection width is determined by a DC voltage applied to a pulse width modulator U2. This DC voltage is generated within IC U1 by a digital to analog converter 16, also configured as an R-2R ladder. The width determining DC is generated by converter 16 responsive to 4 bit control data from register 13, and can have one of 16 possible DC values.

Converters 15 and 16 are powered from a 7.6 volt reference regulator 12, within IC U1. This voltage regulator is referenced to an internal band gap voltage reference and is configured to utilize an external dropping resistor R16, coupled to a 12 volt supply. Thus any variations in the 7.6 volt reference regulator 12 will be common to both the amplitude or level determining D to A converter and correction signal generated thereby. The summing block 18 combines the parabolic signal and the DC width voltage which are then output as the East-West correction signal. Hence, to preserve the DC component of the East-West correction signal, ie. horizontal width control, DC coupling is required to the input of comparator U2.

It is desirable that IC U1 should be usable across a range of TV receiver products with various screen sizes, screen surface geometries and deflection yoke assemblies. To achieve such universality requires a greater range of control for many deflection related parameters. Clearly an IC may be designed to have broader control ranges but this incurs penalties of increased IC die area or size, increased IC power dissipation and increased data storage requirements for setup parameters. Hence by utilizing circuitry external to integrated circuit U1, deflection parameters are provided which are compatible with a range of TV receiver products.

FIG. 1 shows component values required for a 27 inch cathode ray tube to center the control ranges for East-West correction and horizontal width control, and also to provide control range consistent with the control value quantization i.e. the absolute voltage change for each data bit change. The maximum correction signal amplitudes are determined by the 7.6 volt regulator 12 within IC U1. It is possible to realize a correction signal condition where maximum values of both the DC component and the parabola are required, where however, the combined voltage swing is limited by the supply voltage set by the internal regulator. Certain combinations of deflection components may require that the absolute change in DC voltage, or waveform amplitude corresponding to a single control data bit be changed to increase or decrease the operational sensitivity of the control function. For example the DC component, which is controlled by 4 data bits, may exhibit granularity where the required DC voltage or horizontal width, cannot be achieved, since a single data bit change steps the DC voltage beyond the desired setup value. To achieve the desired utilization of integrated circuit U1 across a range of TV products an attenuator 200 is advantageously utilized which produces differing attenuations of the AC and DC component of the East-West correction signal.

The East-West signal is directly rather than entirely AC coupled from IC U1 to summing point D via a selective AC/DC attenuator 200. A DC potential divider is formed by series resistors R1, R3 in combination with feedback resistor R10, effectively coupled to ground at U2 output. The insertion loss of the network at DC is largely determined by resistor R3. The parabolic component of the East-West signal is attenuated by potential divider formed by the series network of resistor R1, plus the parallel combination of resistors R3, R2 and capacitor C1 with resistor R10 and capacitor C4 effectively in parallel to ground. This network produces a minimal attenuation of the parabolic component and the loss is being determined by resistor R2. Resistor R1 is also coupled to a selective AC voltage divider formed by resistor R4 and capacitor C2 connected in series to ground. This network provides attenuation at horizontal frequencies. Thus network 200 changes the amplitude ratio of the vertical parabola to DC component such that the voltage change per bit is reduced for the DC component only.

Certain yoke/tube combinations may exhibit vertical trapezoidal distortion of the scanned raster, for example the displayed horizontal line length progressively changes between the top and bottom of the display. Power supply load variations resulting form other deflection circuitry may also introduce a vertically asymmetrical horizontal pincushion distortion. Such vertically varying horizontal deflection distortions are advantageously corrected by asymmetrical correction circuit 300. Capacitor C3, AC couples the parabolic component of the East-West signal from the junction of resistor R1 and capacitor C2 to the anode of diode D1 and the junction of resistors R7 and R8. Resistors R7 and R8 form a voltage divider with resistor R7 connected to a 26 volt supply and resistor R6 connected to ground. The junction of the resistors R7 and R8 provides a positive bias potential to the anode of diode D1, however this potential is insufficient to cause diode D1 to conduct. Diode D1 cathode is coupled to ground via resistor R5. When the amplitude of the AC coupled parabolic waveform plus the positive bias provided by resistors R7 and R8 exceeds the cut in potential of diode D1, a potential divider is formed by resistors R1 and R5. When diode D1 conducts additional AC parabola signal current drawn from IC U1 via resistor R1 reducing the amplitude of the waveform at point A. Resistor R5 determines the degree of attenuation introduced when diode D1 conducts. Asymmetrical shaping of the parabolic waveform results from the time constant "t", of the AC coupling formed by capacitor C3 and resistor R6, and the positive bias applied to diode D1 anode. Time constant "t" is short when compared to the period of the parabola, which causes the parabola to be partially differentiated at the anode of diode D1. When the parabola charges capacitor C3, the positive differentiated signal adds to the positive bias and, when the amplitude is sufficient, causes diode D1 to conduct. At the peak of the parabola the derivative changes polarity and current is removed from capacitor C3. This discharge current is supplied by the bias resistors R6 and R7, since diode D1 can not conduct in the reverse direction. Hence, the bias current charges capacitor C3, causing diode D1 to cease conduction at a higher parabola voltage than that which caused conduction. Thus, the attenuation produced by diode D1 and resistor R5 results in an asymmetrical parabolic correction waveform.

It is known that the switching reference voltage applied to a comparator type of pulse width modulator may be derived from a zener diode. A zener diode voltage reference, may for example, be connected between ground and a power supply rail via a series dropping resistor, often utilizing the same supply as the comparator. With such a configuration, the comparator switching point is determined by the zener voltage, and the stability of the comparator switching point is determined by the zener diode and the power rail. It is also known to use a resistive potential divider to supply a reference switching potential to a comparator. Such a resistive divider may coupled between a voltage supply or multiple supplies and ground, thus instabilities or loading effects existing on the supplies may be coupled to the comparator, resulting in a varying switching potential.

Variation of the comparator switching reference results in spurious pulse width modulation, causing instability of both horizontal deflection width and pincushion correction. A further source of deflection instability may result from a comparator switching differential resulting from input currents and differing input source impedances. The digital to analog converter reference voltage within integrated circuit U1 may vary between different IC production lots. However, the absolute value of the reference is not particularly significant since the values of the components of East-West signal, determined during setup, will compensate for variation in the absolute value of the D to A reference voltage. Thus, with respect to the DC width signal, the various causes of DC errors or offsets, occurring both within the IC, and in the reference supply to the voltage comparator, are compensated during deflection setup. However, this compensation wastes part of the DC width signal control range produced by the 4 data bits. After deflection setup, any variation in these offsets will result in variation of deflection width or pincushion correction. Furthermore, small variations, for example, as a result of power supply loading, or thermal drift between the various compensated offsets may result in visible deflection errors.

The deflection instabilities noted above are minimized by use of inventive reference generating circuit 100, where the inverting or negative input of voltage comparator U2 is advantageously coupled to a positive reference potential or signal generated by circuit 100 of FIG. 1.

In FIG. 1 the inverting input of comparator U2 is advantageously coupled to the positive reference signal generated within integrated circuit U1. The reference potential coupled to the inverting input of voltage comparator U2 is derived by potential division of the 7.6 volt reference regulator within IC U1. This reference voltage is available at a dropping resistor R16 coupled between the IC and the 12 volt supply. The 7.6 volt reference is coupled to a potential divider formed by a series combination of resistors R11 and R12 with resistor R12 coupled to ground. The junction of the resistors produces approximately 3.8 volts which is decoupled to ground by capacitor C 6. The junction of the resistors is also coupled via series resistor R13 to the inverting input of comparator U2. The 7.6 volt reference is used within integrated circuit U1 as a reference supply for digital to analog conversion. Thus, for example, the DC width determining voltage generated by D to A converter 16, will represent the reference supply potential, scaled by the 4 bit digital value from register 13, established during setup. As noted above, the absolute value of the reference potential is not important since the parameter value, for example, pincushion correction or horizontal width, will compensate for variation in the absolute value of the D to A reference voltage. However, the use of inventive circuit 100 ensures that variations in the internal reference voltage are coupled to the voltage comparator U2 inverting input. Thus the comparator switching threshold will move appropriately to follow, or track changes in the control voltage. Inventive circuit 100 ties the comparator switching threshold to the same reference as the digital to analog converters of IC U1, thus voltage differentials or offsets are eliminated. Furthermore, since a single power rail (+7.6V) is used to supply both IC U1 and the comparator input, via a divider, load variations in the single supply are advantageously tracked and erroneous deflection modulation is largely eliminated. The advantageous tracking resulting from the use of a common internally generated voltage reference is absent when multiple power rails are employed, for example, when a zener reference or resistive divider is coupled to +12V or +26V supply rails to generate the comparator DC reference. Hence, the inventive use of the integrated circuit U1 reference voltage as comparator U2 switching reference ensures that variations between integrated circuits in terms of reference voltage or absolute signal amplitude will be tracked by comparator U2 switching point. In addition the use of a single voltage supply avoids the possibility of differential power supply loading causing spurious deflection modulation.

What is claimed is:

1. A deflection apparatus comprising:
   a deflection amplifier;
   a deflection waveform modulation circuit coupled to said deflection amplifier;
   a digital to analog converter for generating a modulation signal;
   means for generating a reference signal that is coupled to said digital to analog converter thereby subjecting said modulation signal to signal variations in accordance with variations of said reference signal; and,
   a comparator having two inputs, said digital to analog converter being coupled to one of the inputs, and said reference signal being coupled to one of the inputs, such that signals developed at said comparator inputs track one another in accordance with said variation of said reference signal, said comparator having an output coupled to said deflection waveform modulation circuit for waveform modulation.

2. The apparatus of claim 1, wherein said reference signal is coupled to said comparator via a potential divider.

3. The apparatus of claim 1, wherein said modulation signal comprises a vertical rate parabolic signal.

4. The apparatus of claim 1, wherein said modulation signal comprises a DC component for determining an amplitude of said deflection waveform modulation.

5. The apparatus of claim 3, wherein said modulation signal further comprises a DC component for determining an amplitude of said deflection waveform modulation.

6. The apparatus of claim 4, wherein said DC component varies in accordance with said reference signal.

7. The apparatus of claim 1, wherein said modulation signal is directly coupled to one of said comparator inputs and said comparator output is directly coupled to said deflection waveform modulation circuit such that a DC component of said modulation signal establishes an amplitude of said deflection waveform.

8. The apparatus of claim 1, wherein said digital to analog converter and said means for generating a reference signal are within an integrated circuit.

9. The apparatus of claim 1, wherein one of the inputs of said comparator is further coupled to a horizontal rate ramp signal, an instantaneous amplitude of said modulation signal and said ramp signal varying with respect to said reference signal to produce a pulse width modulated signal at said output, having a fixed horizontal rate and a pulse width responsive to said modulation signal.

10. The apparatus of claim 1, wherein said digital to analog converter is controlled responsive to a data word coupled via a data bus.

11. The apparatus of claim 1, wherein said digital to analog converter is controlled responsive to said data word coupled from a memory.

12. The apparatus of claim 11, wherein said digital to analog converter is controlled responsive to a data word coupled from a memory, said memory being coupled to a data bus.

13. The apparatus of claim 1, wherein said deflection waveform modulation circuit comprises a diode modulator.

14. A deflection apparatus comprising:
a deflection amplifier;
a deflection waveform modulation circuit coupled to said deflection amplifier;
a source of a deflection waveform correction signal, where said signal is controlled in level by a digital to analog converter responsive to a data word;
means for generating a reference potential that is coupled to said digital to analog converter for generating said deflection correction signal wherein variation of said reference potential is tracked by corresponding variation of said deflection waveform correction signal; and,
a comparator having two inputs, one of the inputs being coupled to said deflection correction signal and one of the inputs being coupled to said reference potential, said deflection correction signal and said reference potential tracking one with the other such that a comparator output responds to differences between said inputs, said comparator output being coupled to said deflection waveform modulation circuit for waveform modulation.

15. The apparatus of claim 14, wherein said source of a deflection waveform correction signal is an integrated circuit.

16. The apparatus of claim 15, wherein said integrated circuit is controllably coupled to a data bus.

17. The apparatus of claim 14, wherein said reference potential developing means is incorporated within said source.

18. The apparatus of claim 14, wherein said deflection waveform correction signal comprises a vertical rate signal of parabolic wave shape for pincushion correction and a DC component for horizontal deflection width control.

19. The apparatus of claim 14, wherein said reference potential is coupled to one of said comparator inputs via a potential divider.

20. The apparatus of claim 14, wherein said digital to analog converter is controlled responsive to a data word coupled from a memory.

* * * * *